United States Patent
Galica et al.

(10) Patent No.: US 7,365,336 B1
(45) Date of Patent: Apr. 29, 2008

(54) SCINTILLATOR-BASED LOW ENERGY PARTICLE IMAGING SPECTROMETER

(75) Inventors: Gary E. Galica, Medford, MA (US); Francesca Scire-Scappuzzo, Somerville, MA (US); Joy S. G. Stafford-Evans, Andover, MA (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 168 days.

(21) Appl. No.: 11/129,754

(22) Filed: May 13, 2005

(51) Int. Cl.
*G01T 1/20* (2006.01)
(52) U.S. Cl. .................. 250/367; 250/361 R
(58) Field of Classification Search .......... 250/367, 250/361 R, 366; 73/170.27
See application file for complete search history.

(56) References Cited

U.S. PATENT DOCUMENTS

| | | | |
|---|---|---|---|
| 4,933,562 A * | 6/1990 | Roziere ................... | 250/367 |
| 5,714,761 A * | 2/1998 | Fay ........................ | 250/367 |
| 5,905,263 A * | 5/1999 | Nishizawa et al. ...... | 250/368 |
| 2003/0193029 A1* | 10/2003 | Shao ..................... | 250/363.03 |
| 2003/0220740 A1* | 11/2003 | Intriligator et al. ...... | 702/3 |

OTHER PUBLICATIONS

McComas, D.J. et al. "Solar Wind Electron Proton Alpha Monitor (SWEPAM) for the Advanced Composition Explorer", http://web.archive.org/web/20040414224231/http://swepam.lanl.gov/paper.html, Dec. 19, 2006.*
Nightingale et al., "CRRES Spectrometer for Electrons and Protons" Journal of Spacecraft and Rockets, 1992, vol. 29, No. 4, pp. 614-617.*
Galica et al., Scintillator-Based Low Energy Particle Imaging Spectrometer for Nanosatellites, Sep. 2001, Spacecraft Charging Technology, Procedings of the Seventh International Conference, ESA SP-476, p. 287.*

* cited by examiner

*Primary Examiner*—David Porta
*Assistant Examiner*—Carolyn Igyarto
(74) *Attorney, Agent, or Firm*—AFMCLO/JAZ; William G. Auton

(57) ABSTRACT

The Low-energy Imaging Particle Spectrometer (LIPS) is configured as a "pinhole camera" with particle-specific scintillator focal planes. The scintillators are designed specifically to respond only to either protons or electrons within a specific energy range. The scintillators are coupled directly to a multi-anode photomultiplier tube (PMT). Owing to their particle-specific response, the scintillators themselves provide the particle discrimination. The pulse amplitude defines the particle energy and the spatial position provides angular information.

6 Claims, 4 Drawing Sheets

SCINTILLATOR-BASED LOW ENERGY PARTICLE IMAGING SPECTROMETER

STATEMENT OF GOVERNMENT INTEREST

The invention described herein may be manufactured and used by or for the Government for governmental purposes without the payment of any royalty thereon.

CROSS REFERENCE TO RELATED APPLICATION

The invention relates generally to spectroscopy, and more specifically, it relates imaging spectrometer. The need to monitor space weather is becoming essential because of the potential for satellite loss or service interruption during periods of high geomagnetic activity or severe radiation conditions. Space weather is the manifestation of the intimate connection between the earth and the sun. The space surrounding the earth is a highly dynamic environment that responds to changes in the sun, which is constantly bombarding the earth with high-energy particles and radiation.

The task of providing a space weather monitoring system is alleviated, to some extent, by the systems disclosed in the following U.S. patents, the disclosures of which are incorporated herein by reference:

U.S. Pat. No. 5,378,894 issued to Akai, which is incorporated herein by reference, shows a right hand scintillator for use in an X-ray detector including a scintillator channel separator.

U.S. Pat. No. 6,740,859, issued to Wojcik, which is incorporated herein by reference, shows a fractional subtraction resistive readout for position sensitive photomultiplier tubes.

U.S. Pat. No. 6,717,174, issued to Karellas, which is incorporated herein by reference, show a system for quantitative radiographic imaging for obtaining an electronic representation of the low-energy x-ray pattern.

While the above-cited reference are instructive, a need remains to provide a low energy particle spectrometer to assess the space weather threat. The present invention is intended to satisfy that need.

SUMMARY OF THE INVENTION

The present invention is a scintillator based particle imaging spectrometer to detect space weather hazards. It uses, as a collecting means a nanosatellite which houses a low energy particle collection panel with an aperture that conducts low energy particles to both the electron scintillators and the proton scintillators. The invention uses a plurality of electron scintillators which produce output signals when receiving a low energy electron from the collecting means; and a plurality of proton scintillators which produce output signals when receiving low energy protons from the collecting means.

The invention uses as a combining means a first and second signal multiplexor, the first signal multiplexor combining all the output signals of the electron scintillators, and the second multiplexor combining all the output signals of the proton scintillators.

Finally, the invention uses a spectrometer which produces an exo atmospheric space weather image by processing the combined election sensing signal and the combined proton sensing signal.

DESCRIPTION OF THE PREFERRED EMBODIMENT

Figure 1:
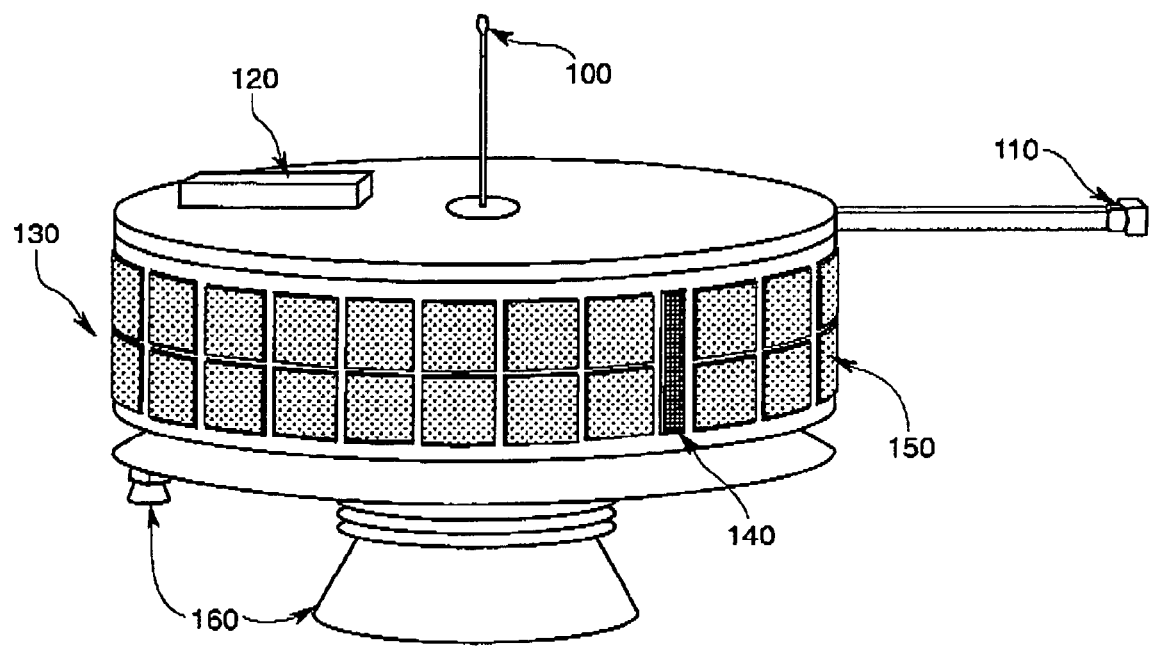
FIG. 1 is an illustration of the NASA nanosatellite that uses the present invention.

The present invention is a scintillator based on low energy particle imaging spectrometer for use with nanosatellites to assess the space weather threat. The reader's attention is directed towards FIG. 1, which illustrates the NASA DRACO nanosatellite that will be used with the present invention. A nanosatellite is a 10-20 Kg vehicle with a 30 cm diameter and has 5-10 watts of available power. Its elements include the communications antenna 100, patch antenna 120, magnetometer 110, plasma analyzer 130, particle detector 140, solar arrays 150, and thrusters 160 for acquiring space weather information.

Figure 2:
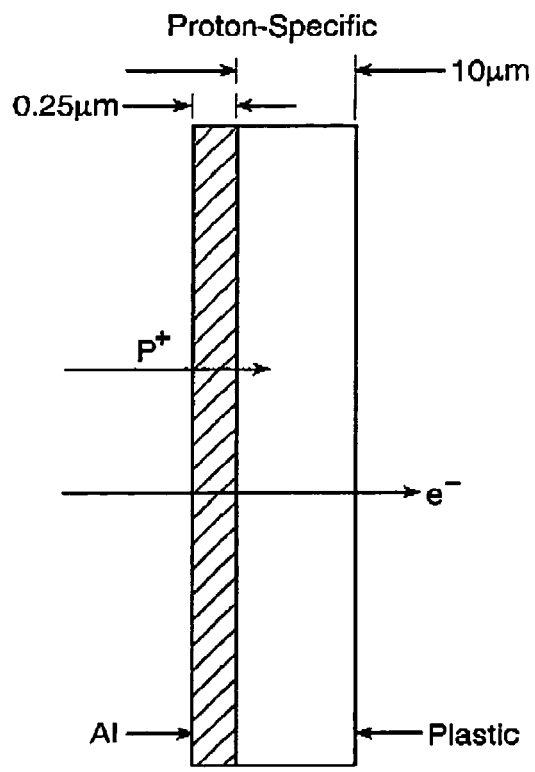
FIGS. 2 and 3 are side views respectively showing a proton specific scintillator and an electron specific scintillator.
Figure 3:
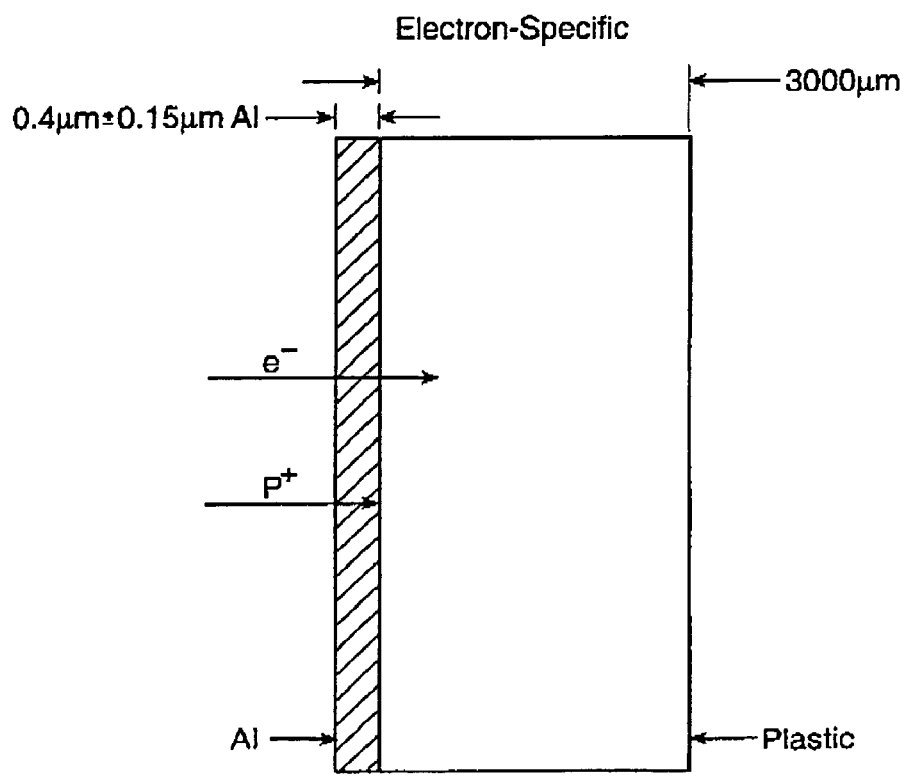

FIGS. 2 and 3 are side views of two particle specific scintillators of the present invention. FIG. 2 is a proton specific scintillator composed of about a 0.25 µm aluminum coating over a 10 µm plastic polymer. As shown, protons are stopped with the scintillator of FIG. 2.

In FIG. 3, the electron specific scintillator is about a 4 µm±0.15 µm aluminum on about a 3,000 µm plastic polymer where the elections are stopped in the plastic scintillator and protons are stopped before the plastic scintillator.

Figure 4:
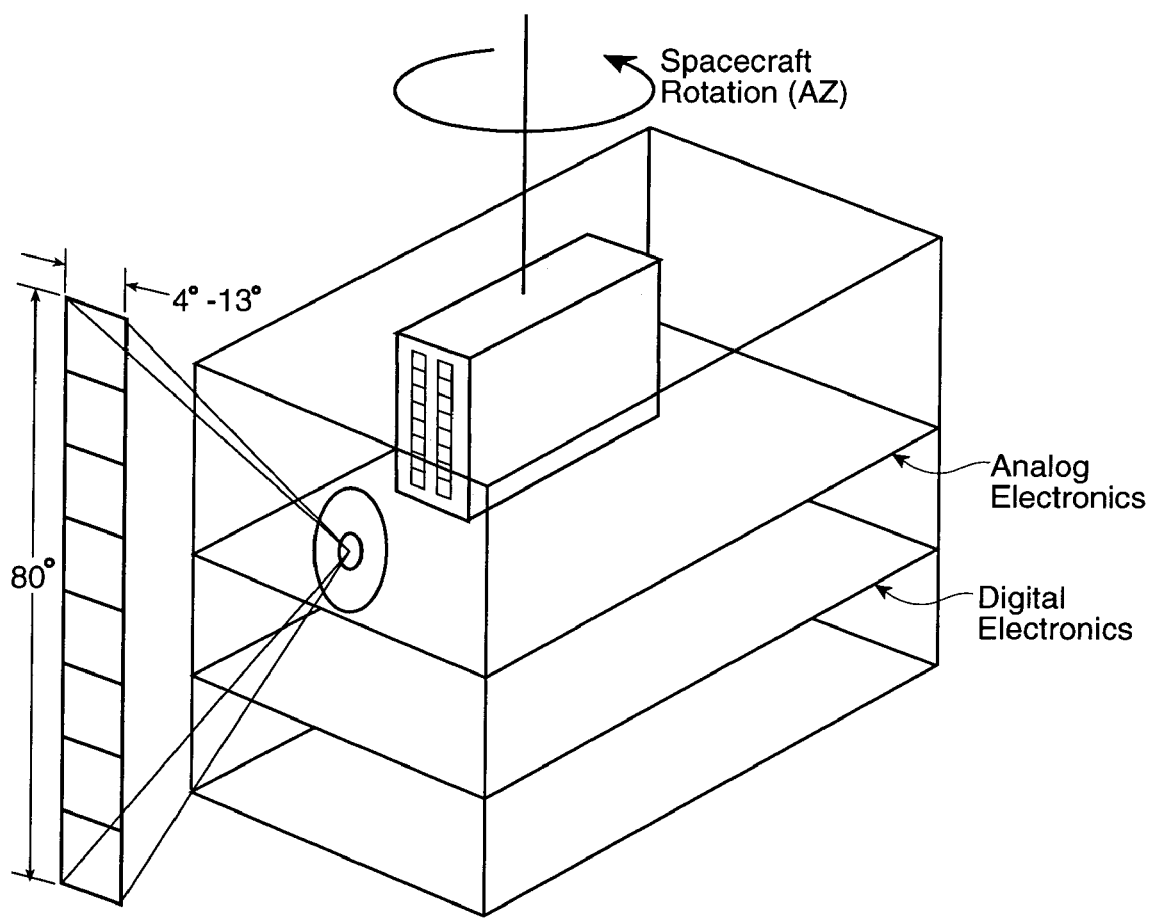
FIG. 4 is an illustration of the nanosatellite sensor configuration of the present invention.

FIG. 4 is an illustration of the nanosatellite sensor configuration of the present invention. The face of the sensor is a plate with a pinhole aperture that admits illumination with an 80-degree field of view. The particle sensor of FIG. 4 has two vertical columns, one with 8 proton scintillators, and one with 8 election scintillators, with characteristics as described above. The scintillator detector signals are coupled by analog electronics and digital electronics into a spectrometer for analysis, as described in the prior art patents cited above.

Figure 5:
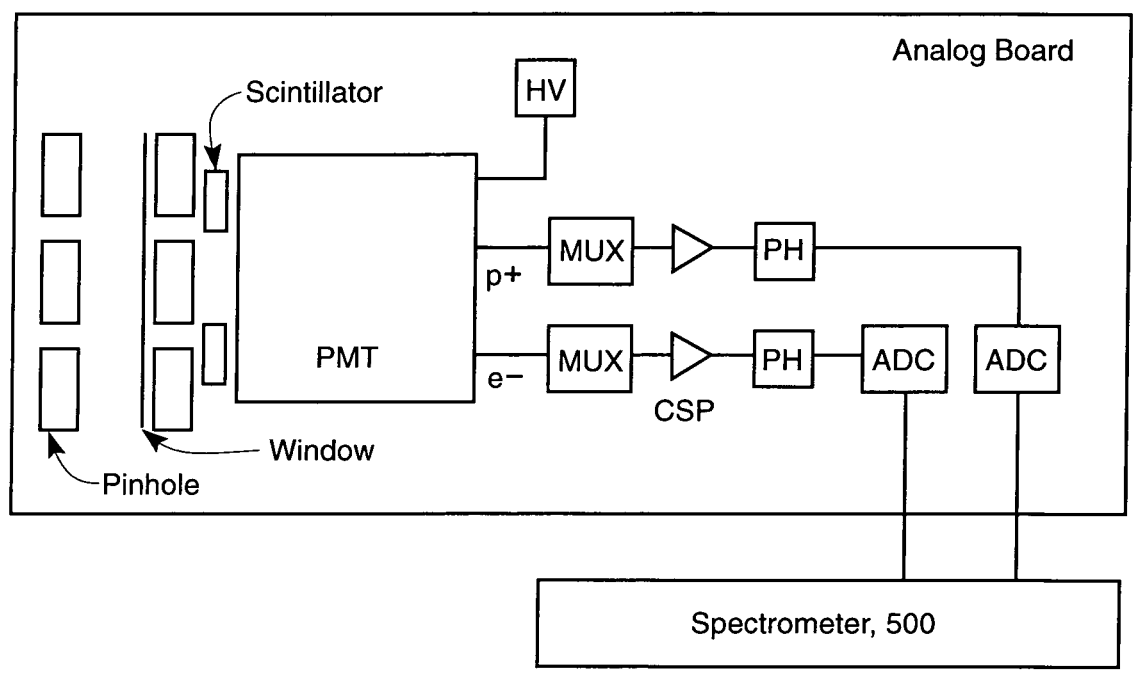
FIG. 5 is a block diagram of the nanosatellite sensor of FIG. 4.

FIG. 5 is a side view of the block diagram of the nanosatellite sensor of FIG. 4. It has multiple pinholes aligned with multiple scintillator focal planes which are vertical columns of separate proton and electron sensors. The outputs of all the proton and electron sensors are respectively multiplexed into a combined proton sensor signal and a separate combined electron sensor signal. Each of these are respectively amplified by the Charge Sensitive Preamplifier (CSP) and processed for output to the spectrometer.

While the invention has been described in its presently preferred embodiment it is understood that the words, which have been used, are words of description rather than words of limitation and that changes within the purview of the appended claims may be made without departing from the scope and spirit of the invention in its broader aspects.

What is claimed is:

1. A scintillator based particle imaging spectrometer composing:

a means for collecting exoatmospheric low energy particles;

a plurality of electron scintillators which produce output signals when receiving a low energy electron from the collecting means, each electron scintillator having a plastic scintillator which has an input surface and an output surface, and which reacts to produce an output signal when struck by a low energy electron; and a 4.0 micron aluminum coating which is affixed to the input surface of the plastic scintillator to block protons and admit low energy electrons from the collecting means;

a plurality of proton scintillators which produce output signals when receiving low energy protons from the collecting means;

a first combining means which produces a combined electron sensing signal by combining all the output signals from the electron scintillators;

a second combining means which produces a combined proton sensing signal by combining all the output signals from the proton scintillators; and a spectrometer which produces an exoatmospheric space weather image by processing the combined electron sensing signal and the combined proton sensing signal.

2. A scintillator based particle imaging spectrometer, as defined in claim 1, wherein said plastic scintillator comprises a plastic substrate that is 3,000 microns in thickness.

3. A scintillator based particle imaging spectrometer, as defined in claim 1, wherein said proton scintillators each comprise:

a second plastic scintillator which has a second input face and a second output face, and which is about 10 microns in thickness to react to produce a second output signal when struck by a low energy proton, and about a 0.2 micron aluminum coating which is affixed to the second input surface of the second plastic scintillator to admit low energy protons from the collecting means.

4. A scintillator based particle imaging spectrometer, as defined in claim 2, wherein said proton scintillators each comprise:

a second plastic scintillator which has a second input face and a second output face, and which is about 10 microns in thickness to react to produce a second output signal when struck by a low energy proton; and a 0.2 micron aluminum coating which is affixed to the second input surface of the second plastic scintillator to admit low energy protons from the collecting means.

5. A scintillator based particle imaging spectrometer comprising:

a nanosatellite which houses a low energy particle collection panel with an aperture that conducts low energy particles to both a plurality of electron scintillators and a plurality of proton scintillators;

the plurality of electron scintillators produce output signals when receiving a low energy electron from the collecting panel, each electron scintillator having a plastic scintillator which has an input surface and an output surface, and which reacts to produce an output signal when struck by a low energy electron; and a 4.0 micron aluminum coating which is affixed to the input surface of the plastic scintillator to block protons and admit low energy electrons from the collecting means;

the plurality of proton scintillators produce output signals when receiving low energy protons from the collecting panel;

a first signal multiplexor combining all the output signals of the election scintillators into a combined electron sensing signal;

a second multiplexor combining all the output signals of the proton scintillators into a combined proton sensing signal; and a spectrometer which produces an exoatmospheric space weather image by processing the combined electron sensing signal and the combined proton sensing signal.

6. A scintillator based particle imaging spectrometer, as defined in claim 5, wherein the plastic scintillator comprises a plastic substrate that is 3,000 microns in thickness.

* * * * *